Aug. 26, 1969    TAKASHI TAKAOKA ET AL    3,463,898
WELDING DEVICE UTILIZING LASER BEAMS

Filed July 6, 1966    2 Sheets-Sheet 1

INVENTORS
Takashi TAKAOKA
& Yuji OKABE.

BY Stephen H. Frishauf
    Atty

United States Patent Office 3,463,898
Patented Aug. 26, 1969

---

3,463,898
WELDING DEVICE UTILIZING LASER BEAMS
Takashi Takaoka, Kawasaki-shi, and Yuji Okabe, Tokyo, Japan, assignors to Tokyo Shibaura Electric Co., Ltd., Kawasaki-shi, Japan, a corporation of Japan
Filed July 6, 1966, Ser. No. 563,118
Claims priority, application Japan, July 9, 1965, 40/40,820; Dec. 17, 1965, 40/77,339
Int. Cl. H05b 7/18
U.S. Cl. 219—121        2 Claims

ABSTRACT OF THE DISCLOSURE

A laser beam welding apparatus for simultaneously welding a plurality of desired points wherein a single laser beam emitted from a laser source is divided into a plurality of laser beams propagating in different directions. The divided laser beams are then focused on a plurality of welding points according to the angle at which the divided laser beams impinge a focusing member.

---

This invention relates to a welding device by utilizing laser beams.

As a recent tendency there have been developed welding devices utilizing the intense beam of coherent radiation emitted by the laser that can be focussed to a fine point wherein great energy can be obtained.

According to this prior method, the laser beam having a great energy is emitted in the form of, for example, pulses, and condensed by an optical system consisting of lenses and other mechanisms. When the condensed beam is directed onto two metal members to be welded mounted on a suitable specimen plate the point where the laser beam strikes is suddenly heated and melted locally, whereby welding is performed.

As previously stated, in the case where two metal members are welded by utilizing the laser beam, the temperature at the jointed area between the metal members is generally elevated higher than the melting point of the metal members to be welded.

However, in the aforementioned device, if the energy of the laser beam directed onto the metal members to be welded grows greater than needed, the temperature of the jointed area of the metal raises to its boiling point, accordingly resulting in an evaporated metal to be welded and a weak weld. Particularly in welding thick metal plates, such a defect as mentioned above is noticeable and it will become difficult to make a strong weld.

As previously stated, the welding device utilizing the laser beam has a major advantage that metal to be welded is heated locally so that welding of a very fine point can be ensured. In a conventional device, however, the energy of the laser beam emitted and the time of emission are affected a great deal by the material, thermal property and shape of the job to be welded; and accordingly all these elements are required to be of very high accuracy, which makes it extremely difficult to handle the device. Furthermore, the utilization of the laser beam causes the sudden, local thermal expansion of only the metal surface on which the beam is darted; but its vicinity is not subjected to any transformation by temperatures and therefore the fused metal explosively scatters upward, resulting in insufficiently welded metal members.

A conceivable method of preventing such local evaporation and scatter of metal members to be welded as stated above is to use a pressure plate consisting of glass or the like, which is pressed on the surface of said metal members to be welded to which the laser beam is darted. In this case, however, it is very inconvenient for practical use because the pressure plate surface is likely to be damaged by the aforementioned evaporation and scatter of melted metal.

The laser beam having an advantage that its utilization permits the welding of a very fine spot, has also found applications in connecting the lead wires of such a semiconductor device as a mesa transistor with electrodes of a semiconductor element.

The utilization of the laser beam for welding the lead wires and electrodes of the semiconductor elements dispenses with stems of especially high heat resistivity which has been indispensable prerequisite for carrying out the conventional heat pressure welding method for lead wire and electrode welding. In addition it has such an advantage that the electrodes and fine lead wires may be produced from such metals as not only aluminum (Al) and gold (Au) but also nickel (Ni), molybdenum (Mo), tungsten (W), silver (Ag), and copper (Cu), and their alloys. This welding method, however, has such a disadvantage that if the beam of coherent radiation emitted by the laser is focussed to an excessively small spot, the fine lead wire is locally heated and fused, a spot-like through-hole being made. Namely, in the case where the lead wire is excessively heated locally, the laser beam penetrates through even the electrode surface under the lead wire, making a hole in it whereby a p-n junction necessary for the action of transistor will be destroyed. Another disadvantage encountered in the prior method is that the fine lead wire is liable to breakage, or a preset fine lead wire is quite often disconnected by an electrical shock induced by energy concentration. If the beam is focused loosely in order to make the spot wider for the purpose of preventing the extreme concentration of the laser beam, the spot will be too wide to concentrate the laser beam into the desired scope of welding, with the result that materials to be welded can not be melted properly due to waste of energy and the purpose of welding can not be fulfilled.

In contrast thereto, the present invention provides a welding device utilizing the laser beam which is not affected by the material or other factors of metal members to be welded and which moreover is capable of being easily adjusted.

It is therefore an object of this invention to provide a welding device utilizing the laser beam, which enables the arbitrary selection of the focusing state of the laser beam to be darted to metal members to be welded.

It is another object of the invention to provide a welding device utilizing the laser beam, which is provided with an optical system designed to readily vary the laser beam emitting position to metal members so that the welding position can be easily adjusted.

A further object of the invention resides in the provision of a welding device utilizing the laser beam, which enables the simultaneous welding of plural spots of metal members by dividing the beam of coherent radiation emitted by a single laser light source into desired plural directions.

Another object of the invention resides in the provision of a welding device utilizing the laser beam, which is provided, for the purpose of pressure plate protection, with a protective agent between a pressure plate used to press a metal member to be welded and the surface of the metal member to be welded.

These and other features, objects and advantages of this invention will become more obvious from the following description when taken in connection with the accompanying drawings, wherein.

Figure 1:
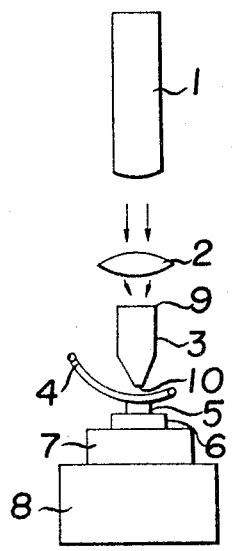
FIG. 1 is a schematic illustration of this invention.

Referring now to the drawings, and more particularly to FIG. 1 thereof, the laser beam is emitted from a laser beam source 1 using a ruby rod for example. Said laser beam is condensed by an object glass 2 and subsequently, from the top 9 of an optical medium 3, glass or other material, having a conical lower portion, located in a laser beam passage. A part of the laser beam transmits outward through the wall of the medium 3 when passing through the optical medium 3 but a larger part of the beam is concentrated to the conic lower end 10 of the medium 3 while repeating reflection on the wall. The lower end 10 of the medium 3 is not tapered but has an arbitrary shape, for example, a small flat end, fitting the shape of a metal member 4 to be welded. Accordingly the laser beam passing through the medium 3 is focused without excessively concentrated or dispersed, but with adequate energy density, reaches the lower end. It is possible to effectively heat only the required portion of a fine lead wire 4 placed on the top an electrode 5 of a semiconductor pellet 6 mounted on a stem 7 so that the lead wire 4 is welded firmly with the electrode 5 by locally fusing both the lead wire 4 and the electrode 5. This welding operation can be effectively performed by pressing this wire and electrode; and therefore it is preferable to carry out welding while pressing the portion of the metal member to which the laser beam is directed, directly or indirectly by means of the lower end of the optical medium. The stem 7 is generally fixed on a fine-adjusting base 8, whereby the stem position can be fine-adjusted.

Figure 2:
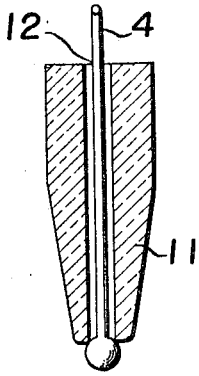
FIGS. 2(A) to 2(D) are various modifications of the optical medium respectviely, of the device shown in FIG. 1.
Figure 2:
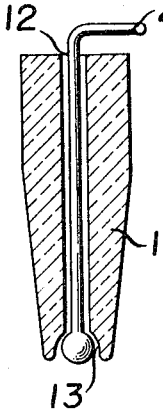
Figure 2:
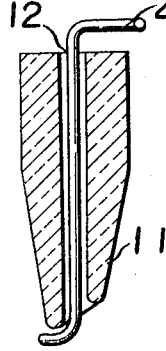
Figure 2:
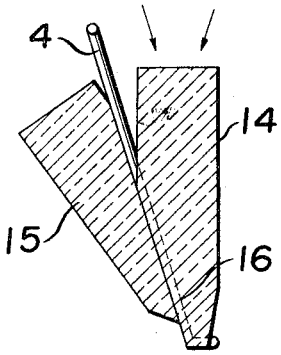

Said optical medium 3 can be designed and built in one body together with the object glass 2, and is desired to be constructed movable within the range that it will never be out of the flux of laser beams. As for the shape, the medium may be, beside the wedge type shown in FIG. 1, of the types of FIGS. 2(A) through 2(C); that is, like an optical medium 11 of a nozzle shape, in the center of which is provided a center hole 12 through which the fine lead wire 4, for example, a metal member of one hand to be welded. Also, as shown in FIG. 2(D), a groove 16 is made in either of the adjacent sides of two beak-like parts 14 and 15; and, in this groove 16 is inserted the fine lead wire so that the laser beam may enter the part 14 in the fine lead wire so that the laser beam may enter the part 14 in the direction of arrow. In these constructions, it is desirable to form the top end of the lead wire 4 into a ball of larger diameter than the bore of the nozzle center hole 12 as shown in FIG. 2(A) so that its length will never change when touched on the electrode surface, or to provide, as viewed in FIG. 2(B), a countersink 13 to the top end of the nozzle in which the rounded top end of the lead wire is fitted. The top end of the wire 4 may be bent and pressed firm against the nozzle as shown in FIGS. 2(C) and 2(D).

The material of the medium to be employed must transmit the laser beam efficiently, be less liable to irregular reflection, and ensure total reflection of beams. From this point, the most suitable materials are quartz and sapphire beside glass.

A smooth medium surface is preferable so as to avoid irregular rflection but to ensure increased total reflection; and accordingly galvanizing the surface is ineffective way.

According to this invention, effective selection of the optimum size of a laser beam spot on the work to be welded can be ensured by making use of the optical medium having a wedge-like end as compared with a device designed to connect leads merely by concentrating the laser beams to one point. Therefore, there will never take place such a trouble that excessive energy concentration makes a through-hole in the metal workpiece to damage the PN junction and the lead wire is disconnected or cut by a shock caused by this tremendous energy concentration. Further, the laser beam spot will never be dispersed to be larger in diameter in excess. This invention also has such an advantage that high pressing effect can be very easily obtained by using the medium itself as the aforementioned pressure plate on the portion of a workpiece to be welded.

Another advantage of this invention lies in that the welding device is applicable not only to connecting lead wires of a semiconductor device but also to welding two metal pieces.

Figure 3:
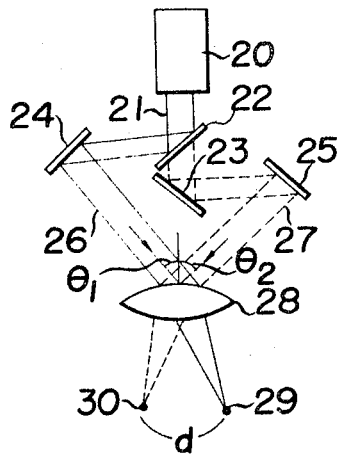
FIG. 3 is a schematic illustration of another example of this invention.

In welding electrodes and lead wires of semiconductor elements, a largely increased operation efficiency can be ensured by carrying out the simultaneous welding of plural lead wires. FIG. 3 illustrates the device for simultaneous welding of plural spots by concentrating the beams emitted by one laser beam source into each of the plural spots.

Figure 4:
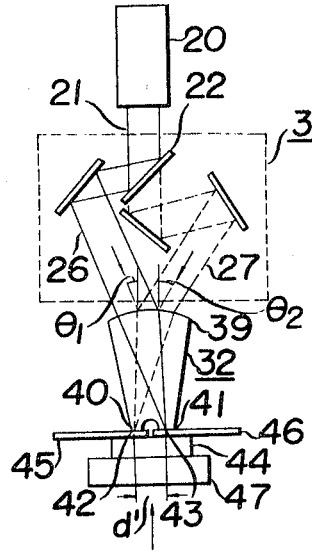
FIG. 4 is a schematic illustration of a modification of the device shown in FIG. 3.

The same parts having the same reference numerals appearing hereinafter will be described by referring to FIGS. 3 and 4. A laser beam 21 emitted from a laser beam source 20 is introduced into the optical system consisting of a semitransparent mirror 22 and reflectors 23, 24 and 25 so arranged as shown in the figure. The laser beam 21 is divided by said semitransparent mirror 22 into parallel beams of a first group 26 and a second group 27 in different directions of progress. The laser beams of these first and second groups 26 and 27 are reflected on the reflectors 24 and 25, going into an optical medium, e.g., a convex lens 28 of focal distance, at the angles of incidence $\theta_1$ and $\theta_2$, respectively. The laser beams incided to the convex lens 28 are focused to a point 29 and a point 30, respectively. In this case, the distance between the points 29 and 30 may be expressed generally by the following equation.

$$d \doteq f(\theta_1 + \theta_2)$$

Accordingly not only the desired distance $d$ can be obtained by determining the angles of incidence $\theta_1$ and $\theta_2$ but also the laser beam can be focused to plural points removed from each other at a desired distance by dividing the laser beam into the desired number of groups and by directing them at an adequate angle of incidence. The angles $\theta_1$ and $\theta_2$ may be varied respectively to desired angles by rotating the reflectors 24, 25 by conventional methods. The device shown in FIG. 4 is a modification of the device shown in FIG. 3. As previously stated, the laser beam 12 coming from the laser beam source 20 is divided into parallel beams of the first group 26 and the second group 27 in different directions of progress by means of the entirely same optical system 31 as shown in FIG. 3. Subsequently provided is one optical medium 32 (hereinafter referred to as the optical cone), which consists of such a substance as glass or sapphire, transparent to the laser beam, with the incident surface 39 ground to a convexity having the similar action of lens as the lens 28 shown in FIG. 3. In addition, protruding parts 40 and 41 are provided at a desired distance $d'$ on the emergent surface, i.e., on the opposite side of the incident surface. These protruding parts, however, are not necessarily indispensable. The radius of curvature of the incident surface 39 is desired to be determined so that when going into the optical cone 32 at the angles of incidence $\theta_1$ and $\theta_2$, the parallel, incident beams 26 and 27 are focused to the points 42 and 43 removed from each other at the distance $d'$ on the surface under the protruding parts 40 and 41. Metal members to be welded to the base 44, for example two lead wires 45 and 46, are placed, one on the other, on the surface of the base 44. The two lead wires 45 and 46 and the base 44 are pressed in such a relation that they are inserted in between the lower ends of the protruding parts 40 and 41 and a plate 47.

In the aforementioned device, the base 44 and the lead wires 45 and 46 are pressed together by the optical cone 32 and the plate 47; and the beams of the first and second groups 26 and 27 are directed into the optical cone 32. Thus the two lead wires 45 and 46, which are members to be welded, are welded simultaneously on the base 44. In this case the size of the gap between the members and the base to be welded is determined by a desired fixed value to be determined by the optical cone 32. Also, inasmuch as the lead wires 45 and 46 are pressed down, on their upper surfaces to be fused, by the lower surfaces of the protruding parts 40 and 41, there is no such danger than the melt-metal will explosively scatter; and even when the work to be welded is extremely thin, the portion to be fused will not become spherical and be separated, due to surface tension, and accordingly perfect welding can be performed. Another advantage of this device resides in that because they can be designed so as to reduce largely the absorption loss of the laser beam, the optical system which divides the laser beam into plural groups and the optical cone is of high efficiency.

In the example of practical applications described above, explanation has been given on the device whereby two spots can be welded; that is, it will be understood from the above that more than two welding spots can be welded simultaneously by appropriately selecting the number of divided laser beam groups and that of focal points on the surface of the optical medium. It is also possible to change the angle of incidence to the optical cone 32 by inserting revolving prisms in the courses of the divided laser beams. Also given above is the description of a device having the optical medium with flat protruding parts. More efficient welding operation can be accomplished by providing adequate grooves to these protruding parts for the purpose of fixing the members to be welded by means of these grooves.

Figure 5:
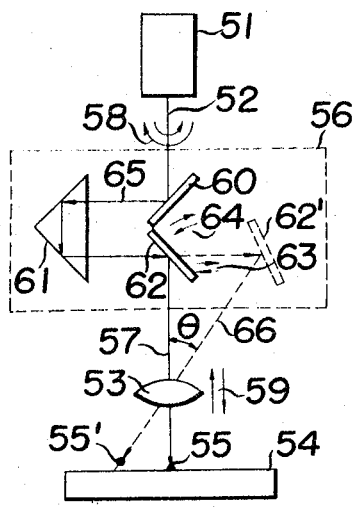
FIG. 5 is a schematic illustration of another example of this invention.

In welding metal members, it is required to change and adjust the welding position. FIG. 5 illustrates a welding device which satisfies this requirement. Namely the laser beam 52 emitted by a laser beam source 51 is condensed by the condensing optical medium, e.g., the convex lens 53, and the calescent point of a laser beam, i.e. an image forming point 55, is formed at the welding spot on the metal members to be welded. Between the convex lens 53 and the laser beam source 51 is arranged a direction-variable optical system 56.

This optical system is composed of, for example, a fixed reflector 60, a rectangular prism or a rectangular reflector 61 consisting of a couple of reflectors, and a position-variable reflector 62. This position-variable reflector 62 is designed to be freely movable rectangularly, i.e., in the direction of arrow 63, to the optical axis 57, and also freely rotatable in the direction of arrow 64 against the vertical axis to the plane of the drawing. These moving and rotating motions can be readily performed by a well-known mechanical means.

In this example of practical application, the reflective surfaces of the fixed reflector 60 and the rectangular reflector 61 are inclined 45 degrees respectively against the optical axis 57.

With the direction-variable optical system 56 so constructed as this, if the position-variable reflector 62 is inserted and inclined 45 degrees against the optical axis 57 as shown by the full line in the figure, the laser beam 52 is directed to form an image at the coalescent point 55 past the course of the full-line arrow 65. However, if the position-variable reflector 62 is moved or rotated in the direction of arrows 63 and 64 to the position shown by dotted lines 62', the laser beam enters the lens 53 at the angle of incidence $\theta$ against the optical axis 57 as shown by dotted lines 66. Accordingly the laser beam image is formed at a point 55'. In the case of a comparatively small metal member 54, the angle of incidence $\theta$ is not required to be wide; and accordingly there will take place no problem substantially even if the image-forming point 55' does not agree accurately with the part to be welded. When this welding position is largely biased and the angle of incidence is large, the angle of incidence can be adjusted by moving the lens 53 in the direction of arrow 59. As is clearly understood from the above description, the laser beam emitting position can be changed to the straightforward direction by moving the position-variable reflector 62 in the arrow 63 and rotating it in the arrow 64 to the desired position, and in addition the laser beam can be shifted to any arbitrary position by rotating the direction-variable optical system 56 in the direction of arrow 58, even if the metal members 54 are kept fixed in one position.

Figure 6:
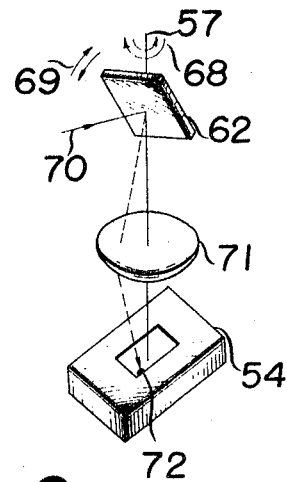
FIG. 6 is a schematic illustration of a modification of the device shown in FIG. 5.

The course of the laser beam can be changed also by other than the above-mentioned means. Namely when the direction-variable optical system 56 and the condensing optical medium 53 are arranged close to each other, it suffices if the optical system, e.g., position-variable reflector 62, as shown in FIG. 6, is so built as to be freely rotatable in the arrow 68 on the center of the optical axis 57 and, at the same time, freely rotatable in the direction in which its inclination to this axis 57 is changed, namely in the arrow 69. Thus, the reflected beam of the laser beam 70 striking the surface of the position-variable reflector 62 is condensed by the optical medium, e.g., a focusing lens 71 directed to a point 72 on the metal members 54. From this, it is clear that the laser beam emitting position can readily be selected in an optional position by rotating the position-variable reflector 62, which is rotatable in two different directions, in the direction of arrows 68 and 69 as desired.

Figure 7:
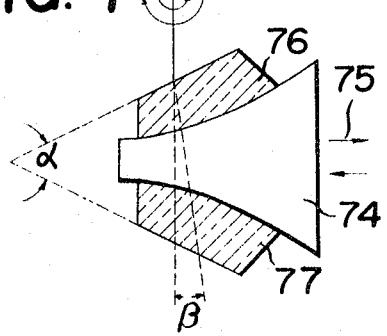
FIG. 7 is a view illustrating a modification of the variable optical system employed in the devices shown in FIGS. 5 and 6.

Furthermore, the direction-variable optical system may be composed of a combination of prisms as shown in FIG. 7. This is because the laser beam is a monochromatic light of high purity and is not dispersed even if passed through an ordinary prism inserted in the course of light; and accordingly the direction of the laser beam can be changed by the angle determined by the shape, refractive index and position of the prism inserted. Namely, as shown in FIG. 7, the direction-variable optical system consists of a transparent movable element 74 having a cylindrical side which is transparent to the laser beam and movable in the arrow 75 and auxiliary elements 76 and 77 arranged in contact with this movable element 74. The upper and lower sides of auxiliary elements 76 and 77 are so arranged as to form a prism having a vertical angle $\alpha$. The vertical angle $\alpha$ of this prism varies if the movable element 74 is moved in the direction of arrow 75. Suppose the refractive index of this prism be $n$, and the range of small vertical angle $\alpha$, the laser beam 52 striking this prism changes its direction by $(n-1)\alpha=\beta$ as shown in the figure. In addition, the prism is provided with a mechanism designed to rotate on the axis of the direction in which the laser beam 52 proceeds. In this case, the laser beam can be focused to any optical point by introducing it into the condensing system by means of the movable element 74.

As previously stated, in welding by utilizing the laser beam, the member to be welded is subjected to sudden thermal expansion locally only in the surface onto which the laser beam is darted, but the vicinity of the surface is not subject to any transformation by temperatures; and therefore the fused metal explosively scatters upward, resulting in most cases in an inadequately welded work.

As previously stated, therefore, a conceivable method of preventing such local evaporation and scatter of metal members to be welded is to use a pressure plate consisting of glass or other, which is pressed on the surface of said metal members to be welded to which the laser beam is darted. In this case, however, it is very inconvenient for practical use because the pressure plate surface is likely to be damaged by the aforementioned evaporation and scatter of melted metal.

Figure 8:
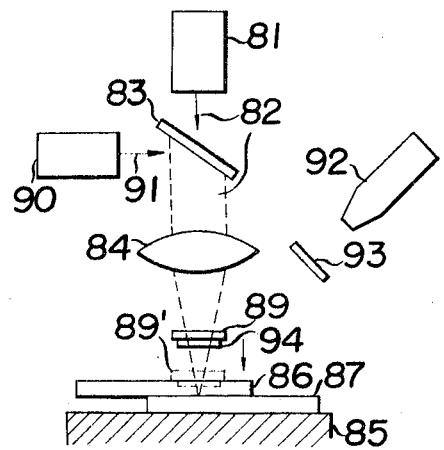
FIG. 8 is a schematic illustration of another example of the present invention.

FIG. 8 shows the welding device, whereby the aforementioned defect can be eliminated and the breakage of the pressure plate can be avoided even in the event of a tremendous laser beam energy. In this device, a laser beam source 81 produces a laser beam 82 having a tremendous energy in the form of, for example, pulses. The laser beam 82 transmits the optical system, e.g., a dichroic mirror 83, being condensed by means of the optical system consisting of lenses and others. The laser beam thus condensed by an optical medium, e.g., a convex lens 84 is darted to the prescribed welding point on two metal members 86 and 87, placed one on the other, on a specimen table 85 as stated later. On the surface of the other metal member 86 to which the laser beam is darted, a pressure plate 89 made of transparent crystal or glass to the laser beam is arranged.

On the left of the mirror 83 is set up a light source 90 for illuminating the metal member 86. The illuminating light 91 coming from the light source 90 is passed through the optical system 84 after reflected by the dichroic mirror 83, illuminating the surface of the metal member 86.

Obliquely above the metal member 86 is located the microscope 92 for observing the state of emission of the laser beam 82. Between the metal member 86 and this microscope 92 is provided the laser beam shutter 93 for protecting the observer's eyes.

The surface of the pressure plate 89 located opposite to the metal member 86 is coated with a protective material 94 for the protection of the pressure plate surface.

In the aforementioned construction, after the position of the metal member 86 is set while viewing through the microscope 92, the pressure plate 89 is moved in the arrow so that the surface coated with the protective material 94 may come into contact with the surface of the metal member 86 as shown by the dotted lines 89' in the figure.

Then, the laser beam is irradiated to the metal member 86, the welding of the members 86 and 87 being performed.

At the time of laser beam injection, the surface of the metal member 86 to which the laser beam is directed rises in temperature over the boiling point as stated previously and at the same time the part to which the beam is darted is subjected to local thermal expansion, resulting in the explosively scattering of melted metal of the member 86.

However, in the device of the present invention, inasmuch as the surface of the metal member 86 and the jointed portion between the metal members are pressed by means of the pressure plate 89, the scatter of melted metal can be thoroughly prevented. Also thanks to the design that the pressure plate 89 is placed in such a manner as to hermetically seal the surface of the metal member 86, the boiling phenomenon of the melted metal can be prevented. Accordingly extremely easy adjustment of laser beam energy and emitting time is ensured. In addition, since the surface of the pressure plate 89 is coated with the protective material 94, the pressure plate can be easily separated from the solidified metal member after completion of welding without impairing the surface of either the pressure plate or the metal member.

According to the inventors' experiments, favorable results could be obtained by using quartz glass for the pressure plate and alcohol, water, glycerine, and silicone oil for the protective material.

The protective material can be selected arbitrarily in accordance with the material of the members to be welded.

In the foregoing example of practical applications, description was given on the device wherein the optical device and the pressure plate were arranged separately. The use of the unitary structure consisting of both the optical device and the pressure plate, e.g., the optical cone, is allowed.

In the foregoing example of practical applications, a liquid substance was employed as the protective material to be used between the pressure plate and the metal member. This liquid protective material is fully practicable when the laser beam energy to be emitted is small. But, in the case of a tremendous energy, this type of protective material is not adequate to protect the pressure plate.

Figure 9:
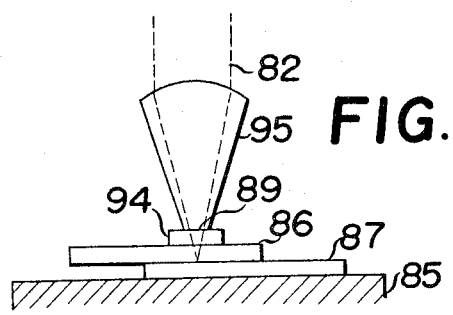
FIG. 9 is a view showing the major part of a modification of the device shown in FIG. 8.

Next, an example of applications of solid-state protective material will be explained by referring to FIG. 9, where the same parts appearing also in FIG. 8 are provided with the same reference numerals. In FIG. 9, all parts corresponding to those in FIG. 8 are omitted.

In this figure, the reference numeral 85 indicates the prescribed specimen plate, on which are placed the metal members to be welded consisting of, for example, two pieces of metal 86 and 87, one on the top of the other.

An optical cone 95 serves as the optical medium for focusing the laser beam 82 and also as the pressure plate for pressing the metal members to be welded. Between the lower end 89 of this optical cone serving as the pressure plate and the metal members, fine particles of, for example, glass are used as the protective material 94.

In the device described above, the emission of the laser beam ensures very easy and effective welding but at the same time causes the explosion of melted metal. As stated previously, the protective material is broken by mechanical and thermal shocks caused by this explosion, but the much more costly pressure plate, for example, the lower end 98 of the optical cone can be protected thoroughly. Also, as a solid-state protective material holds firmly on the surface of the metal member to be welded, the melted metal can be prevented from scattering. Furthermore, it is possible to choose optional thickness of protective material according to the amount of the laser beam energy to be used.

In addition, the pressure plate and the optical device can be separated for individual use as shown in FIG. 8.

As previously stated, the use of a solid-state substance as the protective material can prevent the scatter and evaporation of the fused metal and protect the pressure plate perfectly even if the energy to be supplied is tremendously great.

According to the device stated above, the wider permissible of the amount of energy and the time for laser beam emission can be provided; and a device which is easy to handle can be provided also. Besides, since the scatter of melted metal of the work to be welded can be prevented, the device can make a strong weld.

While this invention has been described with particular reference to the construction shown in the drawing, it is to be understood that such is not to be construed as imparting limitations upon the invention, which is best defined by the claims appended hereto.

What is claimed is:

1. A laser beam welding apparatus comprising:
   a laser beam source;
   an optical system in the path of a laser beam emitted from said source, said optical system consisting of dividing means for dividing said laser beam into a plurality of laser beams travelling in different directions and reflecting means for reflecting said divided laser beams concentratedly in one general direction;
   and focusing means made of laser beam transparent material in the path of the reflected laser beams, said focussing means having a convex top surface and a pluraltiy of spaced protruding parts at the bottom surface for applying pressure to a workpiece at points desired to be welded, each of said reflected beams impinging said top surface at a different predetermined angle, said focusing means concentrating each of said incident laser beams on different protruding parts according to said predetermined angles to weld different points on said workpiece under respective protruding parts (40, 41).

2. Apparatus according to claim 1 wherein said focusing means comprises an optical cone having said convex top surface and said protruding parts at its bottom surface.

References Cited

UNITED STATES PATENTS

| | | | |
|---|---|---|---|
| 3,256,524 | 6/1966 | Stauffer | 219—121 |
| 3,262,122 | 7/1966 | Fleisher et al. | 219—121 |
| 1,677,206 | 7/1928 | Pugh | 219—91 |
| 2,321,894 | 6/1943 | Bischoff | 350—171 |
| 2,604,813 | 7/1952 | Gretener | 350—171 |
| 2,817,265 | 12/1957 | Covely | 350—171 |
| 2,884,313 | 4/1959 | Browne | 219—69 |
| 3,096,767 | 7/1963 | Gresser et al. | 219—121 |
| 3,211,046 | 10/1965 | Kennedy | 350—171 |
| 3,304,403 | 2/1967 | Harper | 219—121 |
| 3,369,101 | 2/1968 | Di Curcio | 219—121 |

FOREIGN PATENTS 1,391,750  2/1965  France.

JOSEPH V. TRUHE, Primary Examiner

W. DEXTER BROOKS, Assistant Examiner

U.S. Cl. X.R.

350—171